United States Patent
Abell et al.

(10) Patent No.: US 12,054,573 B2
(45) Date of Patent: Aug. 6, 2024

(54) FUNCTIONALIZED POLYMERS HAVING THERMORESPONSIVE BEHAVIOR

(71) Applicants: Bridgestone Americas Tire Operations, LLC, Nashville, TN (US); Bridgestone Corporation, Chuo-ku (JP)

(72) Inventors: Joshua P. Abell, Franklin, TN (US); Erin Sheepwash, Cuyahoga Falls, OH (US); Noriaki Yukimura, Chuo-ku (JP)

(73) Assignee: Bridgestone Corporation, Chuo-ku (JP)

(*) Notice: Subject to any disclaimer, the term of this patent is extended or adjusted under 35 U.S.C. 154(b) by 88 days.

(21) Appl. No.: 17/168,562

(22) Filed: Feb. 5, 2021

(65) Prior Publication Data

US 2021/0238336 A1 Aug. 5, 2021

Related U.S. Application Data

(60) Provisional application No. 62/970,537, filed on Feb. 5, 2020.

(51) Int. Cl.
*C08F 299/02* (2006.01)

(52) U.S. Cl.
CPC .................. *C08F 299/024* (2013.01)

(58) Field of Classification Search
CPC ............ C08F 222/1063; C08F 290/062; C08F 297/046; C08F 297/04; C08F 299/024; C08F 236/10; C08F 212/18
See application file for complete search history.

(56) References Cited

U.S. PATENT DOCUMENTS

| | | |
|---|---|---|
| 3,426,006 A | 2/1969 | Nutzel et al. |
| 3,652,516 A | 3/1972 | Farrar et al. |
| 3,842,111 A | 10/1974 | Meyer-Simon et al. |
| 3,873,489 A | 3/1975 | Thurn et al. |
| 3,978,103 A | 8/1976 | Meyer-Simon et al. |
| 3,997,581 A | 12/1976 | Pletka et al. |
| 4,002,594 A | 1/1977 | Fetterman |
| 4,429,091 A | 1/1984 | Hall |
| 4,906,706 A | 3/1990 | Hattori et al. |
| 4,990,573 A | 2/1991 | Andreussi et al. |
| 5,064,910 A | 11/1991 | Hattori et al. |
| 5,227,425 A | 7/1993 | Rauline |
| 5,268,439 A | 12/1993 | Hergenrother et al. |
| 5,329,005 A | 7/1994 | Lawson et al. |
| 5,332,810 A | 7/1994 | Lawson et al. |
| 5,393,721 A | 2/1995 | Kitamura et al. |
| 5,491,230 A | 2/1996 | Lawson et al. |
| 5,496,940 A | 3/1996 | Lawson et al. |
| 5,521,309 A | 5/1996 | Antkowiak et al. |
| 5,552,483 A | 9/1996 | Hergenrother et al. |
| 5,567,784 A | 10/1996 | Wieder et al. |
| 5,574,109 A | 11/1996 | Lawson et al. |
| 5,578,542 A | 11/1996 | Lawson et al. |
| 5,580,919 A | 12/1996 | Agostini et al. |
| 5,583,245 A | 12/1996 | Parker et al. |
| 5,663,396 A | 9/1997 | Musleve et al. |
| 5,674,932 A | 10/1997 | Agostini et al. |
| 5,684,171 A | 11/1997 | Wideman et al. |
| 5,684,172 A | 11/1997 | Wideman et al. |
| 5,696,197 A | 12/1997 | Smith et al. |
| 5,698,646 A | 12/1997 | Kitamura et al. |
| 5,717,022 A | 2/1998 | Beckmann et al. |
| 5,719,207 A | 2/1998 | Cohen et al. |
| 5,786,441 A | 7/1998 | Lawson et al. |
| 5,844,050 A | 12/1998 | Fukahori et al. |
| 5,866,171 A | 2/1999 | Kata |
| 5,876,527 A | 3/1999 | Tsuruta et al. |
| 5,931,211 A | 8/1999 | Tamura |
| 5,971,046 A | 10/1999 | Koch et al. |
| 6,342,552 B1 | 1/2002 | Hergenrother et al. |
| 6,503,973 B2 | 1/2003 | Pierre et al. |
| 6,525,118 B2 | 2/2003 | Hergenrother et al. |
| 6,579,949 B1 | 6/2003 | Hergenrother et al. |
| 6,590,017 B1 | 7/2003 | Hergenrother et al. |
| 6,608,145 B1 | 8/2003 | Lin et al. |
| 6,667,362 B2 | 12/2003 | Robert et al. |
| 6,683,135 B2 | 1/2004 | Cruse et al. |
| 6,838,526 B1 | 1/2005 | Sone et al. |
| 6,977,281 B1 | 12/2005 | Ozawa et al. |
| 6,992,147 B1 | 1/2006 | Ozawa et al. |
| 7,351,776 B2 | 4/2008 | Tartamella et al. |
| 7,671,138 B2 | 3/2010 | Luo |
| 7,732,534 B2 | 6/2010 | Luo et al. |
| 7,879,952 B2 | 2/2011 | Luo et al. |
| 8,088,868 B2 | 1/2012 | Luo et al. |
| 9,211,687 B2 | 12/2015 | Browne et al. |
| 2004/0147694 A1 | 7/2004 | Sone et al. |
| 2006/0004131 A1 | 1/2006 | Ozawa et al. |
| 2006/0025539 A1 | 2/2006 | Ozawa et al. |
| 2006/0030657 A1 | 2/2006 | Hogan et al. |
| 2006/0030677 A1 | 2/2006 | Ozawa et al. |
| 2006/0241241 A1 | 10/2006 | Yan et al. |
| 2006/0264589 A1 | 11/2006 | Yan |
| 2006/0264590 A1 | 11/2006 | Hogan et al. |
| 2009/0047489 A1 | 2/2009 | Grummon et al. |
| 2012/0135190 A1 | 5/2012 | Browne et al. |
| 2013/0289209 A1* | 10/2013 | Kwag .................. C08F 297/04 525/299 |
| 2015/0152311 A1 | 6/2015 | Amnon et al. |
| 2015/0344690 A1 | 12/2015 | Jinlian et al. |

FOREIGN PATENT DOCUMENTS

| | | | |
|---|---|---|---|
| EP | 0 890 606 A1 | | 1/1999 |
| JP | 1993-051406 A | | 3/1993 |
| JP | 1993-059103 A | | 3/1993 |
| JP | 1998-306113 A | | 11/1998 |
| JP | 1999-035633 A | | 2/1999 |
| KR | 20060106820 A | * | 10/2006 |

* cited by examiner

*Primary Examiner* — Mark S Kaucher
(74) *Attorney, Agent, or Firm* — Meredith E. Hooker; Arthur M. Reginelli

(57) ABSTRACT

A method for preparing a functionalized polymer includes the steps of (i) polymerizing monomer to form a reactive polymer; and (ii) reacting the reactive polymer with a [poly(hydrocarbylene glycol) hydrocarbyl ether] (meth) acrylate.

20 Claims, No Drawings

FUNCTIONALIZED POLYMERS HAVING THERMORESPONSIVE BEHAVIOR

This application claims the benefit of U.S. Provisional Application Ser. No. 62/970,537 filed on Feb. 5, 2020, which is incorporated herein by reference.

FIELD OF THE INVENTION

One or more embodiments of the present invention relate to functionalized polymers having thermoresponsive behavior and their use in tires.

BACKGROUND OF THE INVENTION

In the art of manufacturing tires, it is desirable to employ rubber vulcanizates that demonstrate reduced hysteresis, i.e., less loss of mechanical energy to heat. For example, rubber vulcanizates that show reduced hysteresis are advantageously employed in tire components, such as sidewalls and treads, to yield tires having desirably low rolling resistance. The hysteresis of a rubber vulcanizate is often attributed to the free polymer chain ends within the crosslinked rubber network, as well as the dissociation of filler agglomerates.

Functionalized polymers have been employed to reduce the hysteresis of rubber vulcanizates. The functional group of the functionalized polymer may reduce the number of free polymer chain ends via interaction with filler particles. Also, the functional group may reduce filler agglomeration. Nevertheless, whether a particular functional group that is imparted to a polymer can reduce hysteresis is often unpredictable.

Functionalized polymers may be prepared by post-polymerization treatment of reactive polymers with certain functionalizing agents. However, whether a reactive polymer can be functionalized by treatment with a particular functionalizing agent can be unpredictable. For example, functionalizing agents that react with one type of polymer do not necessarily react with another type of polymer, and vice versa.

Anionic initiators are known to be useful for the polymerization of conjugated diene monomers to form polydienes having a combination of 1,2-cis-1,4- and trans-1,4-linkages. Anionic initiators are also useful for the copolymerization of conjugated diene monomers with vinyl-substituted aromatic compounds. The polymers prepared with anionic initiators may display living characteristics in that, upon completion of the polymerization, the polymer chains possess living ends that are capable of reacting with additional monomers for further chain growth or reacting with certain functionalizing agents to give functionalized polymers.

Because functionalized polymers are advantageous, especially in the manufacture of tires, there exists a need to develop new functionalized polymers that give reduced hysteresis.

SUMMARY OF THE INVENTION

Embodiments of the present invention provide a method for preparing a functionalized polymer, the method comprising the steps of (i) polymerizing monomer to form a reactive polymer; and (ii) reacting the reactive polymer with a [poly(hydrocarbylene glycol) hydrocarbyl ether] (meth)acrylate.

Still other embodiments of the present invention provide a method for preparing a functionalized polymer, the method comprising the steps of (i) polymerizing conjugated diene monomer, and optionally monomer copolymerizable therewith, to form polymer having a reactive chain end; (ii) reacting the reactive chain end of the polymer with a compatibilizing agent to prepare a sterically hindered reactive polymer; and (iii) reacting the sterically hindered reactive chain end of the polymer reacting the with a [poly(hydrocarbylene glycol) hydrocarbyl ether] (meth)acrylate.

Still other embodiments of the present invention provide a functionalized polymer prepared by the steps of (i) polymerizing monomer to form a reactive polymer; and (ii) reacting the reactive polymer with a [poly(hydrocarbylene glycol) hydrocarbyl ether] (meth)acrylate.

Still other embodiments of the present invention provide a thermoresponsive polymer defined by the formula IV:

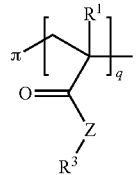

where $R^1$ is a hydrogen atom or a methyl group, Z is a polyalkylene glycol group, $R^3$ is an alkyl group, q is from about 1 to about 12 units, and $\pi$ is a polymer chain.

DETAILED DESCRIPTION OF ILLUSTRATIVE EMBODIMENTS

Embodiments of the present invention are directed to the discovery of [poly(hydrocarbylene glycol) hydrocarbyl ether] (meth)acrylate functional polymers and their usefulness in rubber components, such as those rubber components used in the manufacture of tires. Advantageously, the [poly(hydrocarbylene glycol) hydrocarbyl ether] (meth) acrylate functional polymers exhibit thermoresponsive properties, and therefore these polymers may be referred to as thermoresponsive polymers herein. In one or more embodiments, the thermoresponsive polymers of this invention may include a block of units derived from [poly(hydrocarbylene glycol) hydrocarbyl ether] (meth)acrylates. In one or more embodiments, the thermoresponsive polymers of this invention are advantageously hydrophilic at low temperatures, and therefore the thermoresponsive polymers may be useful in the manufacture of tire treads exhibiting improved snow and ice traction.

Preparation of Thermoresponsive Polymers

In one or more embodiments, thermoresponsive polymers may be prepared by preparing a reactive polymer by anionically polymerizing conjugated diene monomer and optionally monomer copolymerizable therewith. The reactive polymer is then further reacted with a [poly(hydrocarbylene glycol) hydrocarbyl ether] (meth)acrylate functionalizing agent. In one or more embodiments, the reactive polymer is first reacted with a compatibilizing agent to prepare a sterically hindered reactive polymer, and then the sterically hindered reactive polymer is reacted with [poly(hydrocarbylene glycol) hydrocarbyl ether] (meth)acrylate functionalizing agent. Unless specific indicated, the use of the term "(meth)" to modify the term "acrylate" indicates that both acrylates and methacrylates are contemplated. For the purpose of this specification, the [poly(hydrocarbylene glycol) hydrocarbyl ether] (meth)acrylate functionalization agent may also be referred to a functionalized (meth)acrylate monomer.

Examples of conjugated diene monomer that may be used in the preparation of the reactive polymer include 1,3-butadiene, isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1,3-pentadiene, and 2,4-hexadiene. Mixtures of two or more conjugated dienes may also be utilized in copolymerization. Examples of monomer copolymerizable with conjugated diene monomer include vinyl-substituted aromatic compounds such as styrene, p-methylstyrene, α-methylstyrene, and vinylnaphthalene.

In one or more embodiments, the reactive polymer is prepared by anionic polymerization, wherein monomer is polymerized by using an anionic initiator. The key mechanistic features of anionic polymerization have been described in books (e.g., Hsieh, H. L.; Quirk, R. P. Anionic Polymerization: Principles and Practical Applications; Marcel Dekker: New York, 1996) and review articles (e.g., Hadjichristidis, N.; Pitsikalis, M.; Pispas, S.; Iatrou, H.; Chem. Rev. 2001, 101(12), 3747-3792). Anionic initiators may advantageously produce living polymers that, prior to quenching, are capable of reacting with additional monomer for further chain growth or reacting with certain coupling agents to give coupled polymers.

The practice of this invention is not limited by the selection of any particular anionic initiators. In one or more embodiments, the anionic initiator employed is a functional initiator that imparts a functional group at the head of the polymer chain (i.e., the location from which the polymer chain is started). In particular embodiments, the functional group includes one or more heteroatoms (e.g., nitrogen, oxygen, boron, silicon, sulfur, tin, and phosphorus atoms) or heterocyclic groups. In certain embodiments, the functional group reduces the 50° C. hysteresis loss of carbon-black filled vulcanizates prepared from polymers containing the functional group as compared to similar carbon-black filled vulcanizates prepared from polymer that does not include the functional group.

Exemplary anionic initiators include organolithium compounds. In one or more embodiments, organolithium compounds may include heteroatoms. In these or other embodiments, organolithium compounds may include one or more heterocyclic groups.

Types of organolithium compounds include alkyllithium, aryllithium compounds, and cycloalkyllithium compounds. Specific examples of organolithium compounds include ethyllithium, n-propyllithium, isopropyllithium, n-butyllithium, sec-butyllithium, t-butyllithium, n-amyllithium, isoamyllithium, and phenyllithium.

In particular embodiments, the organolithium compounds include a cyclic amine-containing compound such as lithiohexamethyleneimine. These and related useful initiators are disclosed in the U.S. Pat. Nos. 5,332,810, 5,329,005, 5,578,542, 5,393,721, 5,698,646, 5,491,230, 5,521,309, 5,496,940, 5,574,109, and 5,786,441, which are incorporated herein by reference. In other embodiments, the organolithium compounds include lithiated alkylthioacetals such as 2-lithio-2-methyl-1,3-dithiane. These and related useful initiators are disclosed in U.S. Publication Nos. 2006/0030657, 2006/0264590, and 2006/0264589, which are incorporated herein by reference. In still other embodiments, the organolithium compounds include alkoxysilyl-containing initiators, such as lithiated t-butyldimethylpropoxysilane. These and related useful initiators are disclosed in U.S. Publication No. 2006/0241241, which is incorporated herein by reference.

Other anionic initiators include alkylmagnesium halide compounds such as butylmagnesium bromide and phenylmagnesium bromide. Still other anionic initiators include organosodium compounds such as phenylsodium and 2,4, 6-trimethylphenylsodium. Also contemplated are those anionic initiators that give rise to di-living polymers, wherein both ends of a polymer chain are living. Examples of such initiators include dilithio initiators such as those prepared by reacting 1,3-diisopropenylbenzene with sec-butyllithium. These and related difunctional initiators are disclosed in U.S. Pat. No. 3,652,516, which is incorporated herein by reference. Radical anionic initiators may also be employed, including those described in U.S. Pat. No. 5,552, 483, which is incorporated herein by reference.

In one or more embodiments, the anionic initiator employed is trialkyltinlithium compound such as tri-n-butyltinlithium. These and related useful initiators are disclosed in U.S. Pat. Nos. 3,426,006 and 5,268,439, which are incorporated herein by reference.

When elastomeric copolymers containing conjugated diene monomers and vinyl-substituted aromatic monomers are prepared by anionic polymerization, the conjugated diene monomers and vinyl-substituted aromatic monomers may be used at a weight ratio of 95:5 to 50:50, or in other embodiments, 90:10 to 65:35. In order to promote the randomization of comonomers in copolymerization and to control the microstructure (such as 1,2-linkage of conjugated diene monomer) of the polymer, a randomizer, which is typically a polar coordinator, may be employed along with the anionic initiator.

Compounds useful as randomizers include those having an oxygen or nitrogen heteroatom and a non-bonded pair of electrons. Exemplary types of randomizers include linear and cyclic oligomeric oxolanyl alkanes; dialkyl ethers of mono and oligo alkylene glycols (also known as glyme ethers); crown ethers; tertiary amines; linear THF oligomers; alkali metal alkoxides; and alkali metal sulfonates. Linear and cyclic oligomeric oxolanyl alkanes are described in U.S. Pat. No. 4,429,091, which is incorporated herein by reference. Specific examples of randomizers include 2,2-bis(2'-tetrahydrofuryl)propane, 1,2-dimethoxyethane, N,N,N',N'-tetramethylethylenediamine (TMEDA), tetrahydrofuran (THF), 1,2-dipiperidylethane, dipiperidylmethane, hexamethylphosphoramide, N,N'-dimethylpiperazine, diazabicyclooctane, dimethyl ether, diethyl ether, tri-n-butylamine, potassium t-amylate, potassium 4-dodecylsulfonate, and mixtures thereof.

The amount of randomizer employed may depend on various factors such as the desired microstructure of the polymer, the ratio of monomer to comonomer, the polymerization temperature, as well as the nature of the specific randomizer employed. In one or more embodiments, the amount of randomizer employed may range between 0.05 and 100 moles per mole of the anionic initiator.

The anionic initiator and the randomizer can be introduced to the polymerization system by various methods. In one or more embodiments, the anionic initiator and the randomizer may be added separately to the monomer to be polymerized in either a stepwise or simultaneous manner. In other embodiments, the anionic initiator and the randomizer may be pre-mixed outside the polymerization system either in the absence of any monomer or in the presence of a small amount of monomer, and the resulting mixture may be aged, if desired, and then added to the monomer that is to be polymerized.

In one or more embodiments, regardless of what type of anionic initiator is used to prepare the reactive polymer, a solvent may be employed as a carrier to either dissolve or suspend the initiator in order to facilitate the delivery of the initiator to the polymerization system. In other embodiments, monomer can be used as the carrier. In yet other embodiments, the initiator can be used in their neat state without any solvent.

In one or more embodiments, suitable solvents include those organic compounds that will not undergo polymerization or incorporation into propagating polymer chains during the polymerization of monomer in the presence of the catalyst or initiator. In one or more embodiments, these organic species are liquid at ambient temperature and pressure. In one or more embodiments, these organic solvents are inert to the catalyst or initiator. Exemplary organic solvents include hydrocarbons with a low or relatively low boiling point such as aromatic hydrocarbons, aliphatic hydrocarbons, and cycloaliphatic hydrocarbons. Non-limiting examples of aromatic hydrocarbons include benzene, toluene, xylenes, ethylbenzene, diethylbenzene, and mesitylene. Non-limiting examples of aliphatic hydrocarbons include n-pentane, n-hexane, n-heptane, n-octane, n-nonane, n-decane, isopentane, isohexanes, isopentanes, isooctanes, 2,2-dimethylbutane, petroleum ether, kerosene, and petroleum spirits. And, non-limiting examples of cycloaliphatic hydrocarbons include cyclopentane, cyclohexane, methylcyclopentane, and methylcyclohexane. Mixtures of the above hydrocarbons may also be used. As is known in the art, aliphatic and cycloaliphatic hydrocarbons may be desirably employed for environmental reasons. The low-boiling hydrocarbon solvents are typically separated from the polymer upon completion of the polymerization.

Other examples of organic solvents include high-boiling hydrocarbons of high molecular weights, including hydrocarbon oils that are commonly used to oil-extend polymers. Examples of these oils include paraffinic oils, aromatic oils, naphthenic oils, vegetable oils other than castor oils, and low PCA oils including MES, TDAE, SRAE, heavy naphthenic oils. Since these hydrocarbons are non-volatile, they typically do not require separation and remain incorporated in the polymer.

The production of the reactive polymer according to this invention can be accomplished by polymerizing conjugated diene monomer, optionally together with monomer copolymerizable with conjugated diene monomer, in the presence of a catalytically effective amount of the initiator. The introduction of the initiator, the conjugated diene monomer, optionally the comonomer, and any solvent, if employed, forms a polymerization mixture in which the reactive polymer is formed. The amount of the initiator to be employed may depend on the interplay of various factors such as the type of catalyst or initiator employed, the purity of the ingredients, the polymerization temperature, the polymerization rate and conversion desired, the molecular weight desired, and many other factors. Accordingly, a specific initiator amount cannot be definitively set forth except to say that catalytically effective amounts of the initiator may be used.

In other embodiments, where an anionic initiator (e.g., an alkyllithium compound) is employed, the initiator loading may be varied from about 0.05 to about 100 mmol, in other embodiments from about 0.1 to about 50 mmol, and in still other embodiments from about 0.2 to about 5 mmol per 100 gram of monomer.

In one or more embodiments, the polymerization may be carried out in a polymerization system that includes a substantial amount of solvent. In one embodiment, a solution polymerization system may be employed in which both the monomer to be polymerized and the polymer formed are soluble in the solvent. In another embodiment, a precipitation polymerization system may be employed by choosing a solvent in which the polymer formed is insoluble. In both cases, an amount of solvent in addition to the amount of solvent that may be used in preparing the catalyst or initiator is usually added to the polymerization system. The additional solvent may be the same as or different from the solvent used in preparing the catalyst or initiator. Exemplary solvents have been set forth above. In one or more embodiments, the solvent content of the polymerization mixture may be more than 20% by weight, in other embodiments more than 50% by weight, and in still other embodiments more than 80% by weight based on the total weight of the polymerization mixture.

The polymerization may be conducted in any conventional polymerization vessels known in the art. In one or more embodiments, solution polymerization can be conducted in a conventional stirred-tank reactor. In other embodiments, bulk polymerization can be conducted in a conventional stirred-tank reactor, especially if the monomer conversion is less than about 60%. In still other embodiments, especially where the monomer conversion in a bulk polymerization process is higher than about 60%, which typically results in a highly viscous cement, the bulk polymerization may be conducted in an elongated reactor in which the viscous cement under polymerization is driven to move by piston, or substantially by piston. For example, extruders in which the cement is pushed along by a self-cleaning single-screw or double-screw agitator are suitable for this purpose. Examples of useful bulk polymerization processes are disclosed in U.S. Pat. No. 7,351,776, which is incorporated herein by reference.

In one or more embodiments, all of the ingredients used for the polymerization can be combined within a single vessel (e.g., a conventional stirred-tank reactor), and all steps of the polymerization process can be conducted within this vessel. In other embodiments, two or more of the ingredients can be pre-combined in one vessel and then transferred to another vessel where the polymerization of monomer (or at least a major portion thereof) may be conducted.

The polymerization can be carried out as a batch process, a continuous process, or a semi-continuous process. In the semi-continuous process, the monomer is intermittently charged as needed to replace that monomer already polymerized. In one or more embodiments, the conditions under which the polymerization proceeds may be controlled to maintain the temperature of the polymerization mixture within a range from about −10° C. to about 200° C., in other embodiments from about 0° ° C. to about 150° C., and in other embodiments from about 20° C. to about 100° C. In one or more embodiments, the heat of polymerization may be removed by external cooling by a thermally controlled reactor jacket, internal cooling by evaporation and condensation of the monomer through the use of a reflux condenser connected to the reactor, or a combination of the two methods. Also, the polymerization conditions may be controlled to conduct the polymerization under a pressure of from about 0.1 atmosphere to about 50 atmospheres, in other embodiments from about 0.5 atmosphere to about 20 atmosphere, and in other embodiments from about 1 atmosphere to about 10 atmospheres. In one or more embodiments, the pressures at which the polymerization may be carried out include those that ensure that the majority of the monomer is in the liquid phase. In these or other embodiments, the polymerization mixture may be maintained under anaerobic conditions.

Some or all of the polymer chains in the resulting reactive polymer may possess reactive chain ends before the polymerization mixture is quenched. As noted above, the reactive polymer prepared with an anionic initiator (e.g., an alkyllithium initiator) may be referred to as a living polymer. In one or more embodiments, a polymerization mixture including reactive polymer may be referred to as an active polymerization mixture. The percentage of polymer chains possessing a reactive end depends on various factors such as the type of initiator, the type of monomer, the purity of the ingredients, the polymerization temperature, the monomer conversion, and many other factors. In one or more embodiments, at least about 20% of the polymer chains possess a reactive end, in other embodiments at least about 50% of the polymer chains possess a reactive end, and in still other embodiments at least about 80% of the polymer chains possess a reactive end. In any event, the reactive polymer can be reacted with a functionalized (meth)acrylate monomer to form the functionalized polymer of this invention.

In one or more embodiments, the functionalized (meth)acrylate monomer may defined by the formula I:

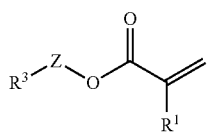

where $R^1$ is a hydrogen atom or a methyl group, Z is a hydrocarbylene glycol group, and $R^3$ is an hydrocarbyl group.

In one or more embodiments, the hydrocarbylene glycol group, Z, is a divalent group that may be defined by the formula $-(O-R)_n-$, where R is a hydrocarbylene group and n is from about 3 to about 8 units.

In one or more embodiments, the hydrocarbyl groups of the functionalized (meth)acrylate monomer may include, but are not limited to, alkyl, cycloalkyl, alkenyl, cycloalkenyl, aryl, allyl, aralkyl, alkaryl, or alkynyl groups. In one or more embodiments, these groups may include from one, or the appropriate minimum number of carbon atoms to form the group, to about 20 carbon atoms.

In one or more embodiments, the hydrocarbylene groups of the functionalized (meth)acrylate monomer may include, but are not limited to, arylene, cycloalkylene, cycloarylene, alkenylene, cycloalkenylene, alkynylene, cycloalkynylene, or arylene groups. In one or more embodiments, these groups may include from one, or the appropriate minimum number of carbon atoms to form the group, to about 20 carbon atoms.

In one or more embodiments, where Z of formula I is defined by the formula $(O-R)_n$, the functionalized (meth)acrylate monomer may defined by the formula II:

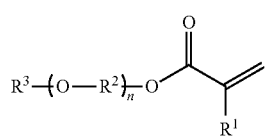

where $R^1$ is a hydrogen atom or a methyl group, $R^2$ is a hydrocarbylene group, $R^3$ is a hydrocarbyl group, and n is an integer from about 3 to about 8.

In one or more embodiments, where the hydrocarbylene group, $R^2$, of formula II is a methylene or polymethylene group, the functionalized (meth)acrylate monomer may be defined by the formula III:

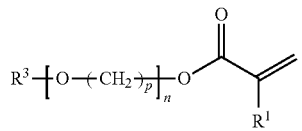

where $R^1$ is a hydrogen atom or a methyl group, $R^3$ is a hydrocarbyl group, p is an integer from about 1 to about 12, and n is an integer from about 3 to about 8.

In one or more embodiments, where p of formula III is 2 and the hydrocarbyl group, $R^3$, is a methyl group, the functionalized (meth)acrylate monomer may be defined by the formula IV:

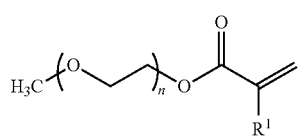

where $R^1$ is a hydrogen atom or a methyl group and n is an integer from about 3 to about 8.

In one or more embodiments, where the hydrocarbylene glycol group, Z, of formula I is an alkylene glycol group and the hydrocarbyl group, $R^3$, is an alkyl group, the functionalized (meth)acrylate monomer may be referred to as a [poly(alkylene glycol) alkyl ether] (meth)acrylate. In one or more embodiments, where the hydrocarbylene glycol group, Z, of formula I is an alkylene glycol group and the hydrocarbyl group, $R^3$, is an aryl group, the functionalized (meth)acrylate monomer may be referred to as a [poly(alkylene glycol) aryl ether] (meth)acrylate. In one or more embodiments, where the hydrocarbylene glycol group, Z, of formula I is an alkylene glycol group and the hydrocarbyl group, $R^3$, is a cycloalkyl group, the functionalized (meth)acrylate monomer may be referred to as a [poly(alkylene glycol) cycloalkyl ether] (meth)acrylate.

In one or more embodiments, where the hydrocarbylene glycol group, Z, of formula I is an arylene glycol group and the hydrocarbyl group, $R^3$, is an alkyl group, the functionalized (meth)acrylate monomer may be referred to as a [poly(arylene glycol) alkyl ether] (meth)acrylate. In one or more embodiments, where the hydrocarbylene glycol group, Z, of formula I is an arylene glycol group and the hydrocarbyl group, $R^3$, is an aryl group, the functionalized (meth)acrylate monomer may be referred to as a [poly(arylene glycol) aryl ether] (meth)acrylate. In one or more embodiments, where the hydrocarbylene glycol group, Z, of formula I is an arylene glycol group and the hydrocarbyl group, $R^3$, is a cycloalkyl group, the functionalized (meth)acrylate monomer may be referred to as a [poly(arylene glycol) cycloalkyl ether] (meth)acrylate.

In one or more embodiments, where the hydrocarbylene glycol group, Z, of formula I is a cycloalkylene glycol group and the hydrocarbyl group, $R^3$, is an alkyl group, the functionalized (meth)acrylate monomer may be referred to as a [poly(cycloalkylene glycol) alkyl ether] (meth)acrylate. In one or more embodiments, where the hydrocarbylene glycol group, Z, of formula I is a cycloalkylene glycol group and the hydrocarbyl group, $R^3$, is an aryl group, the functionalized (meth)acrylate monomer may be referred to as a [poly(cycloalkylene glycol) aryl ether] (meth)acrylate. In one or more embodiments, where the hydrocarbylene glycol group, Z, of formula I is a cycloalkylene glycol group and the hydrocarbyl group, $R^3$, is a cycloalkyl group, the functionalized (meth)acrylate monomer may be referred to as a [poly(cycloalkylene glycol) cycloalkyl ether] (meth)acrylate.

Specific examples of functionalized (meth)acrylate monomer include, but are not limited to poly(methylene glycol) methyl ether methacrylate, poly(methylene glycol) methyl ether acrylate, poly(l-methylethylene glycol) methyl ether methacrylate, poly(l-methylethylene glycol) methyl ether acrylate, poly(ethylene glycol) methyl ether methacrylate, poly(ethylene glycol) methyl ether acrylate, poly(propylene glycol) methyl ether methacrylate, poly(propylene glycol) methyl ether acrylate, poly(2-methylpropylene glycol) methyl ether methacrylate, and poly(2-methylpropylene glycol) methyl ether acrylate.

The amount of the functionalized (meth)acrylate monomer that can be added to the polymerization mixture (i.e. reacted with the reactive polymer or the sterically hindered reactive polymer) to yield the thermoresponsive polymer of this invention may depend on various factors including the type and amount of catalyst or initiator used to synthesize the reactive polymer and the desired amount of repeat functionalized (meth)acrylate monomer units. In one or more embodiments, where the reactive polymer is prepared by using an anionic initiator, the amount of the functionalized (meth)acrylate monomer employed can be described with reference to the amount of metal cation associated with the initiator. For example, where an organolithium initiator is employed, the molar ratio of the lithium cation to the functionalized (meth)acrylate monomer may be from about 1:1 to about 1:12, in other embodiments from about 1:2 to about 1:8, and in other embodiments from 1:4 to about 1:6.

As noted above, a compatibilizing agent may be used to prepare a sterically hindered reactive polymer that may then be reacted with functionalized (meth)acrylate monomer. While not wishing to be bound by any particular reaction or theory, it is believed that the compatibilizing agent adds groups that sterically hinder the living of the polymer while maintaining reactivity. The sterically hindered reactive end promotes a reaction between the reactive end of the polymer and the (meth)acrylate group of the functionalized (meth)acrylate monomer.

Suitable compatibilizing agents include α-hydrocarbylstyrenes. α-hydrocarbylstyrenes include ethylene compounds that have a phenyl group and a hydrocarbyl group or a substituted hydrocarbyl group located on the same carbon of an ethylene compound.

In one or more embodiments, an α-hydrocarbylstyrenes may be defined by the formula

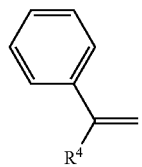

where $R^4$ is a sterically bulky hydrocarbyl or a substituted sterically bulky hydrocarbyl group.

Suitable sterically bulky hydrocarbyl groups include, but not limited to, alkyl, cycloalkyl, alkenyl, cycloalkenyl, aryl, allyl, aralkyl, alkaryl, or alkynyl groups. Substituted hydrocarbyl groups include hydrocarbyl groups in which one or more hydrogen atoms have been replaced by a substituent such as an alkyl group. In one or more embodiments, these groups may include from 2, or the appropriate minimum number of carbon atoms to form the group, to about 20 carbon atoms. These groups may also contain heteroatoms such as, but not limited to, nitrogen, boron, oxygen, silicon, sulfur, tin, and phosphorus atoms.

Non-limiting examples of sterically bulky hydrocarbyl groups include isopropyl, isobutyl, t-butyl, neopentyl, 2-ethylhexyl, cyclohexyl, 1-methylcyclopentyl, and 2,6-dimethylphenyl groups.

Specific examples of α-hydrocarbylstyrenes include α-isopropylstyrene, diphenyl ethylene, α-isobutylstyrene, α-t-butylstyrene, α-neopentylstyrene, α-2-ethylhexylstyrene, cyclohexylstyrene, 1-methylcyclopentylstyrene, and 2,6-dimethylphenylstyrene.

The amount of the compatibilizing agent that can be added to the polymerization mixture (i.e. reacted with the reactive polymer) in the preparation of the thermoresponsive polymer of this invention may depend on various factors including the type and amount of catalyst or initiator used to synthesize the reactive polymer and the desired amount of repeat units of the compatibilizing agent. In one or more embodiments, where the reactive polymer is prepared by using an anionic initiator, the amount of the compatibilizing agent employed can be described with reference to the amount of metal cation associated with the initiator. For example, where an organolithium initiator is employed, the molar ratio of the lithium cation to the compatibilizing agent may be from about 1:1 to about 1:3, in other embodiments from about 1:1.2 to about 1:2, and in other embodiments from 1:1.4 to about 1:1.8.

In one or more embodiments, in addition to the functionalized (meth)acrylate monomer, a co-functionalizing agent may also be added to the polymerization mixture (i.e. reacted with the reactive polymer or the sterically hindered reactive polymer) to functionalize some of the polymer chains. In these or other embodiments, some of the reactive polymers may react with the functionalized (meth)acrylate monomer while other reactive polymers react with the co-functionalizing agent. A mixture of two or more co-functionalizing agents may also be employed. The functionalizing agent may be added to the polymerization mixture prior to, together with, or after the introduction of the functionalized (meth)acrylate monomer. In one or more embodiments, the co-functionalizing agent is added to the polymerization mixture at least 5 minutes prior to, in other embodiments at least 10 minutes prior to, and in other embodiments at least 30 minutes prior to the introduction of the functionalized (meth)acrylate monomer. In other embodiments, the co-functionalizing agent is added to the polymerization mixture at least 5 minutes after, in other embodiments at least 10 minutes after, and in other embodiments at least 30 minutes after the introduction of the functionalized (meth)acrylate monomer.

In one or more embodiments, functionalizing agents include compounds or reagents that can react with a reactive polymer produced by this invention and thereby provide the polymer with a functional group other than the functionalized (meth)acrylate monomer that is distinct from a propagating chain that has not been reacted with the functionalizing agent. The functional group may be reactive or interactive with other polymer chains (propagating and/or non-propagating) or with other constituents such as reinforcing fillers (e.g. carbon black) that may be combined with the polymer. In one or more embodiments, the reaction between the functionalizing agent and the reactive polymer proceeds via an addition or substitution reaction.

Useful co-functionalizing agents may include compounds that simply provide a functional group at the end of a polymer chain without joining two or more polymer chains together, as well as compounds that can couple or join two or more polymer chains together via a functional linkage to form a single macromolecule. The latter type of co-functionalizing agents may also be referred to as coupling agents. Because certain functionalizing agents may serve to couple polymer chains in addition to providing the polymer chain with a useful functionality, the coupling agents may simply be referred to as functionalizing agents herein.

In one or more embodiments, functionalizing agents include compounds that will add or impart a heteroatom to the polymer chain. In particular embodiments, functionalizing agents include those compounds that will impart a functional group to the polymer chain to form a functionalized polymer that reduces the 50° C. hysteresis loss of a carbon-black filled vulcanizates prepared from the functionalized polymer as compared to similar carbon-black filled vulcanizates prepared from non-functionalized polymer. In one or more embodiments, this reduction in hysteresis loss is at least 5%, in other embodiments at least 10%, and in other embodiments at least 15%.

In one or more embodiments, suitable functionalizing agents include those compounds that contain groups that may react with the reactive polymers produced in accordance with this invention. Exemplary functionalizing agents include ketones, quinones, aldehydes, amides, esters, isocyanates, isothiocyanates, epoxides, imines, aminoketones, aminothioketones, and acid anhydrides. Examples of these compounds are disclosed in U.S. Pat. Nos. 4,906,706, 4,990,573, 5,064,910, 5,567,784, 5,844,050, 6,838,526, 6,977,281, and 6,992,147; U.S. Publication Nos. 2006/0004131 A1, 2006/0025539 A1, 2006/0030677 A1, and 2004/0147694 A1; Japanese Patent Application Nos. 05-051406A, 05-059103A, 10-306113A, and 11-035633A; which are incorporated herein by reference. Other examples of co-functionalizing agents include azine compounds as described in U.S. Pat. No. 7,879,952, hydrobenzamide compounds as disclosed in U.S. Pat. No. 7,671,138, nitro compounds as disclosed in U.S. Pat. No. 7,732,534, and protected oxime compounds as disclosed in U.S. Pat. No. 8,088,868, all of which are incorporated herein by reference.

In particular embodiments, the functionalizing agents employed may be metal halides, metalloid halides, alkoxysilanes, metal carboxylates, hydrocarbylmetal carboxylates, hydrocarbylmetal ester-carboxylates, and metal alkoxides.

Exemplary metal halide compounds include tin tetrachloride, tin tetrabromide, tin tetraiodide, n-butyltin trichloride, phenyltin trichloride, di-n-butyltin dichloride, diphenyltin dichloride, tri-n-butyltin chloride, triphenyltin chloride, germanium tetrachloride, germanium tetrabromide, germanium tetraiodide, n-butylgermanium trichloride, di-n-butylgermanium dichloride, and tri-n-butylgermanium chloride.

Exemplary metalloid halide compounds include silicon tetrachloride, silicon tetrabromide, silicon tetraiodide, methyltrichlorosilane, phenyltrichlorosilane, dimethyldichlorosilane, diphenyldichlorosilane, boron trichloride, boron tribromide, boron triiodide, phosphorous trichloride, phosphorous tribromide, and phosphorus triiodide.

In one or more embodiments, the alkoxysilanes may include at least one group selected from the group consisting of an epoxy group and an isocyanate group.

Exemplary alkoxysilane compounds including an epoxy group include (3-glycidyloxypropyl)trimethoxysilane, (3-glycidyloxypropyl)triethoxysilane, (3-glycidyloxypropyl)triphenoxysilane, (3-glycidyloxypropyl)methyldimethoxysilane, (3-glycidyloxypropyl)methyldiethoxysilane, (3-glycidyloxypropyl)methyldiphenoxysilane, [2-(3,4-epoxycyclohexyl)ethyl]trimethoxysilane, and [2-(3,4-epoxycyclohexyl)ethyl]triethoxysilane.

Exemplary alkoxysilane compounds including an isocyanate group include (3-isocyanatopropyl)trimethoxysilane, (3-isocyanatopropyl)triethoxysilane, (3-isocyanatopropyl)triphenoxysilane, (3-isocyanatopropyl)methyldimethoxysilane, (3-isocyanatopropyl)methyldiethoxysilane (3-isocyanatopropyl)methyldiphenoxysilane, and (isocyanatomethyl)methyldimethoxysilane.

Exemplary metal carboxylate compounds include tin tetraacetate, tin bis(2-ethylhexanaote), and tin bis(neodecanoate).

Exemplary hydrocarbylmetal carboxylate compounds include triphenyltin 2-ethylhexanoate, tri-n-butyltin 2-ethylhexanoate, tri-n-butyltin neodecanoate, triisobutyltin 2-ethylhexanoate, diphenyltin bis(2-ethylhexanoate), di-n-butyltin bis(2-ethylhexanoate), di-n-butyltin bis(neodecanoate), phenyltin tris(2-ethylhexanoate), and n-butyltin tris(2-ethylhexanoate).

Exemplary hydrocarbylmetal ester-carboxylate compounds include di-n-butyltin bis(n-octylmaleate), di-n-octyltin bis(n-octylmaleate), diphenyltin bis(n-octylmaleate), di-n-butyltin bis(2-ethylhexylmaleate), di-n-octyltin bis(2-ethylhexylmaleate), and diphenyltin bis(2-ethylhexylmaleate).

Exemplary metal alkoxide compounds include dimethoxytin, diethoxytin, tetraethoxytin, tetra-n-propoxytin, tetraisopropoxytin, tetra-n-butoxytin, tetraisobutoxytin, tetra-t-butoxytin, and tetraphenoxytin.

The amount of the co-functionalizing agent that can be added to the polymerization mixture may depend on various factors including the type and amount of catalyst or initiator used to synthesize the reactive polymer and the desired degree of functionalization. In one or more embodiments, such as where the reactive polymer is prepared by using an anionic initiator, the amount of the co-functionalizing agent employed can be described with reference to the amount of metal cation associated with the initiator. For example, where an organolithium initiator is employed, the molar ratio of the co-functionalizing agent to the lithium cation may be from about 0.3:1 to about 2:1, in other embodiments from about 0.6:1 to about 1.5:1, and in other embodiments from 0.8:1 to about 1.2:1.

The amount of the co-functionalizing agent employed can also be described with reference to the functionalized (meth) acrylate monomer. In one or more embodiments, the molar ratio of the co-functionalizing agent to the functionalized (meth)acrylate monomer may be from about 0.1:1 to about 10:1, in other embodiments from about 0.2:1 to about 5:1, and in other embodiments from about 0.5:1 to about 2:1.

In one or more embodiments, the functionalized (meth) acrylate monomer (and optionally the co-functionalizing agent) may be introduced to the polymerization mixture at a location (e.g., within a vessel) where the polymerization has been conducted. In other embodiments, functionalized (meth)acrylate monomer may be introduced to the polymerization mixture at a location that is distinct from where the polymerization has taken place. For example, the functionalized (meth)acrylate monomer may be introduced to the polymerization mixture in downstream vessels including downstream reactors or tanks, in-line reactors or mixers, extruders, or devolatilizers.

In one or more embodiments, functionalized (meth)acrylate monomer (and optionally the co-functionalizing agent) can be reacted with the reactive polymer after a desired monomer conversion is achieved but before the polymerization mixture is quenched by a quenching agent. In one or more embodiments, the reaction between the functionalized (meth)acrylate monomer and the reactive polymer may take place within 30 minutes, in other embodiments within 5 minutes, and in other embodiments within one minute after the peak polymerization temperature is reached. In one or more embodiments, the reaction between the functionalized (meth)acrylate monomer and the reactive polymer can occur once the peak polymerization temperature is reached. In other embodiments, the reaction between the functionalized (meth)acrylate monomer and the reactive polymer can occur after the reactive polymer has been stored. Regardless of the timing of the addition of the functionalized (meth)acrylate monomer, the functionalized (meth)acrylate monomer may be added after addition of a compatibilizing agent.

In one or more embodiments, the storage of the reactive polymer occurs at room temperature or below room temperature under an inert atmosphere. In one or more embodiments, the reaction between the functionalized (meth)acrylate monomer and the reactive polymer may take place at a temperature from about 10° C. to about 150° C., and in other embodiments from about 20° C. to about 100° C. The time required for completing the reaction between the functionalized (meth)acrylate monomer and the reactive polymer depends on various factors such as the type and amount of the catalyst or initiator used to prepare the reactive polymer, the type and amount of the functionalized (meth)acrylate monomer, as well as the temperature at which the coupling reaction is conducted. In one or more embodiments, the reaction between the functionalized (meth)acrylate monomer and the reactive polymer can be conducted for about 10 to 60 minutes.

In one or more embodiments, after the reaction between the reactive polymer and the functionalized (meth)acrylate monomer (and optionally the co-functionalizing agent) has been accomplished or completed, a quenching agent can be added to the polymerization mixture in order to protonate the reaction product between the reactive polymer and the co-functionalized (meth)acrylate monomer, inactivate any residual reactive polymer chains, and/or inactivate the catalyst or catalyst components. The quenching agent may include a protic compound, which includes, but is not limited to, an alcohol, a carboxylic acid, an inorganic acid, water, or a mixture thereof. An antioxidant such as 2,6-di-tert-butyl-4-methylphenol may be added along with, before, or after the addition of the quenching agent. The amount of the antioxidant employed may be in the range of 0.2% to 1% by weight of the polymer product. Additionally, the polymer product can be oil extended by adding an oil to the polymer, which may be in the form of a polymer cement or polymer dissolved or suspended in monomer. Practice of the present invention does not limit the amount of oil that may be added, and therefore conventional amounts may be added (e.g., 5-50 phr). Useful oils or extenders that may be employed include, but are not limited to, aromatic oils, paraffinic oils, naphthenic oils, vegetable oils other than castor oils, low PCA oils including MES, TDAE, and SRAE, and heavy naphthenic oils.

Once the polymerization mixture has been quenched, the various constituents of the polymerization mixture may be recovered. In one or more embodiments, the unreacted monomer can be recovered from the polymerization mixture. For example, the monomer can be distilled from the polymerization mixture by using techniques known in the art. In one or more embodiments, a devolatilizer may be employed to remove the monomer from the polymerization mixture. Once the monomer has been removed from the polymerization mixture, the monomer may be purified, stored, and/or recycled back to the polymerization process.

The polymer product may be recovered from the polymerization mixture by using techniques known in the art. In one or more embodiments, desolventization and drying techniques may be used. For instance, the polymer can be recovered by passing the polymerization mixture through a heated screw apparatus, such as a desolventizing extruder, in which the volatile substances are removed by evaporation at appropriate temperatures (e.g., about 100° C. to about 170°) C. and under atmospheric or sub-atmospheric pressure. This treatment serves to remove unreacted monomer as well as any low-boiling solvent. Alternatively, the polymer can also be recovered by subjecting the polymerization mixture to steam desolventization, followed by drying the resulting polymer crumbs in a hot air tunnel. The polymer can also be recovered by directly drying the polymerization mixture on a drum dryer.

Thermoresponsive Polymers

The reactive polymer and the functionalized (meth)acrylate monomer (and optionally the functionalizing agent) are believed to react to produce a novel thermoresponsive polymer, wherein the a residue or repeating units derived from the functionalized (meth)acrylate monomer are imparted to the end of at least one polymer chain. It is believed that the reactive end of the polymer chain reacts with the functionalized (meth)acrylate monomer to form a thermoresponsive polymer. Nonetheless, the exact chemical structure of the thermoresponsive polymer produced in every embodiment is not known with any great degree of certainty, particularly as the structure relates to the residue or repeating units imparted to the polymer chain end by the functionalized (meth)acrylate monomer and optionally the co-functionalizing agent. Indeed, it is speculated that the structure of the thermoresponsive polymer may depend upon various factors such as the conditions employed to prepare the reactive polymer (e.g., the type and amount of the catalyst or initiator) and the conditions employed to react the functionalized (meth)acrylate monomer (and optionally the functionalizing agent) with the reactive polymer (e.g., the types and amounts of the functionalized (meth)acrylate monomer and the co-functionalizing agent) and the use of a compatibilizing agent. The thermoresponsive polymer resulting from the reaction between the reactive polymer and functionalized (meth)acrylate monomer can be protonated or further modified.

In one or more embodiments, one of the products resulting from the reaction between the reactive polymer and the functionalized (meth)acrylate monomer may be defined by formula V:

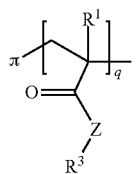

where $R^1$ is a hydrogen atom or a methyl group, Z is a hydrocarbylene glycol group, and $R^3$ is an hydrocarbyl group, q is an integer from about 1 to about 12 units, and π is a polymer chain.

In one or more embodiments, where hydrocarbylene glycol, Z, of formula V is defined by the formula $(R-O)_n$, the thermoresponsive polymer may be defined by formula VI:

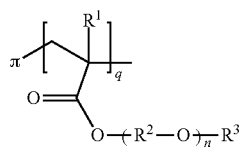

where $R^1$ is a hydrogen atom or a methyl group, $R^2$ is a hydrocarbylene group, $R^3$ is a hydrocarbyl group, n is an integer from about 3 to about 8, q is an integer from about 1 to about 12, and π is a polymer chain.

In one or more embodiments, where the hydrocarbylene group, $R^2$, of formula VI is a methylene or polymethylene group, the thermoresponsive polymer may be defined by formula VII:

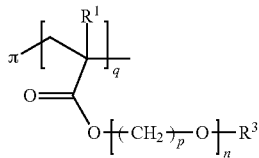

where $R^1$ is a hydrogen atom or a methyl group, $R^3$ is a hydrocarbyl group, p is an integer from about 1 to about 12, and n is an integer from about 3 to about 8, q is an integer from about 1 to about 12, and π is a polymer chain.

In one or more embodiments, the polymer chain (i.e. π) of the thermoresponsive polymer may contain unsaturation. In these or other embodiments, the thermoresponsive polymers are vulcanizable. In one or more embodiments, the thermoresponsive polymers can have a glass transition temperature ($T_g$) that is less than 0° C., in other embodiments less than −20° C., and in other embodiments less than −30° C. In one embodiment, these polymers may exhibit a single glass transition temperature. In particular embodiments, the polymers may be hydrogenated or partially hydrogenated.

In one or more embodiments, the polymer chain of the thermoresponsive polymers of this invention may be a polydiene polymer chain having medium or low cis-1,4-linkage contents. These polymers, which can be prepared by anionic polymerization techniques, can have a cis-1,4-linkage content of from about 10% to 60%, in other embodiments from about 15% to 55%, and in other embodiments from about 20% to about 50% where the percentages are based upon the number of diene mer units adopting the cis-1,4-linkage versus the total number of diene mer units. These polydienes may also have a 1,2-linkage content from about 10% to about 90%, in other embodiments from about 10% to about 60%, in other embodiments from about 15% to about 50%, and in other embodiments from about 20% to about 45% where the percentages are based upon the number of diene mer units adopting the 1,2-linkage versus the total number of diene mer units. The cis-1,4- and 1,2-linkage contents can be determined by infrared spectroscopy. In particular embodiments, where the polydienes are prepared by employing a functional anionic initiator, the head of the polymer chain includes a functional group that is the residue of the functional initiator. The number average molecular weight ($M_n$) of these polymers may be from about 1,000 to about 1,000,000, in other embodiments from about 5,000 to about 200,000, in other embodiments from about 25,000 to about 150,000, and in other embodiments from about 50,000 to about 120,000, as determined by using gel permeation chromatography (GPC) calibrated with polystyrene standards and Mark-Houwink constants for the polymer in question. The molecular weight distribution or polydispersity ($M_w/M_n$) of these polymers may be from about 1.5 to about 5.0, and in other embodiments from about 2.0 to about 4.0.

In particular embodiments, the thermoresponsive polymers of this invention include polymer chains that are copolymers of 1,3-butadiene, styrene, and optionally isoprene. These may include random copolymers and block copolymers.

As noted above, a compatibilizing may be used in the polymerization of a thermoresponsive polymer. In these or other embodiments, the polymer chain of the thermoresponsive polymer may include a compatibilizing block. The compatibilizing block may be situated where the polymer chain meets the block of units derived from functionalized (meth)acrylate monomer. A compatibilizing block may include a unit or units derived from monomers that include large sterically hindering groups. In one or more embodiments, the compatibilizing block may include a unit or units derived from the polymerization of α-hydrocarbylstyrenes.

INDUSTRIAL APPLICABILITY

In one or more embodiments, the thermoresponsive polymers are useful in preparing rubber compositions that can be used to manufacture tire components. Rubber compounding techniques and the additives employed therein are generally disclosed in *The Compounding and Vulcanization of Rubber*, in *Rubber Technology* (2nd Ed. 1973).

The rubber compositions can be prepared by using the thermoresponsive polymers alone or together with other elastomers (i.e., polymers that can be vulcanized to form compositions possessing rubbery or elastomeric properties). Other elastomers that may be used include natural and synthetic rubbers. The synthetic rubbers typically derive from the polymerization of conjugated diene monomers, the copolymerization of conjugated diene monomers with other monomers such as vinyl-substituted aromatic monomers, or the copolymerization of ethylene with one or more α-olefins and optionally one or more diene monomers.

In one or more embodiments, where a thermoresponsive polymer is in a rubber composition with other elastomers, the rubber composition may be characterized by the weight percent of the thermoresponsive polymer in the rubber component, with the balance including one or more other elastomers.

In one or more embodiments, the weight percent of the thermoresponsive polymer in the rubber component is at least 1%, in other embodiments at least 3%, in other embodiments at least 5%, in other embodiments at least 10%, in other embodiments at least 20% with the balance including one or more other elastomers. In one or more embodiments, the weight percent of the thermoresponsive polymer in the rubber component is at most 99%, in other embodiments at most 95%, in other embodiments at most 90%, in other embodiments at most 80%, in other embodiments at most 50% with the balance including one or more other elastomers. In one or more embodiments, the weight percent of the thermoresponsive polymer in the rubber component is from about 1% to about 99%, in other embodiments from about 3% to about 95%, in other embodiments from about 5% to about 90%, in other embodiments from about 10% to about 80%, in other embodiments from about 20% to about 50% with the balance including one or more other elastomers.

Exemplary elastomers include natural rubber, synthetic polyisoprene, polybutadiene, polyisobutylene-co-isoprene, neoprene, poly(ethylene-co-propylene), poly(styrene-co-butadiene), poly(styrene-co-isoprene), poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof. These elastomers can have a myriad of macromolecular structures including linear, branched, and star-shaped structures.

The rubber compositions may include fillers such as inorganic and organic fillers. Examples of organic fillers include carbon black and starch. Examples of inorganic fillers include silica, aluminum hydroxide, magnesium hydroxide, mica, talc (hydrated magnesium silicate), and clays (hydrated aluminum silicates). Carbon blacks and silicas are the most common fillers used in manufacturing tires. In certain embodiments, a mixture of different fillers may be advantageously employed.

In one or more embodiments, carbon blacks include furnace blacks, channel blacks, and lamp blacks. More specific examples of carbon blacks include super abrasion furnace blacks, intermediate super abrasion furnace blacks, high abrasion furnace blacks, fast extrusion furnace blacks, fine furnace blacks, semi-reinforcing furnace blacks, medium processing channel blacks, hard processing channel blacks, conducting channel blacks, and acetylene blacks.

In particular embodiments, the carbon blacks may have a surface area (EMSA) of at least 20 $m^2/g$ and in other embodiments at least 35 $m^2/g$; surface area values can be determined by ASTM D-1765 using the cetyltrimethylammonium bromide (CTAB) technique. The carbon blacks may be in a pelletized form or an unpelletized flocculent form. The preferred form of carbon black may depend upon the type of mixing equipment used to mix the rubber compound.

The amount of carbon black employed in the rubber compositions can be up to about 50 parts by weight per 100 parts by weight of rubber (phr), with about 5 to about 40 phr being typical.

Some commercially available silicas which may be used include Hi-Sil™ 215, Hi-Sil™ 233, and Hi-Sil™ 190 (PPG Industries, Inc.; Pittsburgh, Pa.). Other suppliers of commercially available silica include Grace Davison (Baltimore, Md.), Degussa Corp. (Parsippany, N.J.), Rhodia Silica Systems (Cranbury, N.J.), and J. M. Huber Corp. (Edison, N.J.).

In one or more embodiments, silicas may be characterized by their surface areas, which give a measure of their reinforcing character. The Brunauer, Emmet and Teller ("BET") method (described in *J. Am. Chem. Soc., vol.* 60, p. 309 et seq.) is a recognized method for determining the surface area. The BET surface area of silica is generally less than 450 $m^2/g$. Useful ranges of surface area include from about 32 to about 400 $m^2/g$, about 100 to about 250 $m^2/g$, and about 150 to about 220 $m^2/g$.

The pH's of the silicas are generally from about 5 to about 7 or slightly over 7, or in other embodiments from about 5.5 to about 6.8.

In one or more embodiments, where silica is employed as a filler (alone or in combination with other fillers), a coupling agent and/or a shielding agent may be added to the rubber compositions during mixing in order to enhance the interaction of silica with the elastomers. Useful coupling agents and shielding agents are disclosed in U.S. Pat. Nos. 3,842,111, 3,873,489, 3,978,103, 3,997,581, 4,002,594, 5,580,919, 5,583,245, 5,663,396, 5,674,932, 5,684,171, 5,684,172 5,696,197, 6,608,145, 6,667,362, 6,579,949, 6,590,017, 6,525,118, 6,342,552, and 6,683,135, which are incorporated herein by reference.

The amount of silica employed in the rubber compositions can be from about 1 to about 100 phr or in other embodiments from about 5 to about 80 phr. The useful upper range is limited by the high viscosity imparted by silicas. When silica is used together with carbon black, the amount of silica can be decreased to as low as about 1 phr; as the amount of silica is decreased, lesser amounts of coupling agents and shielding agents can be employed. Generally, the amounts of coupling agents and shielding agents range from about 4% to about 20% based on the weight of silica used.

A multitude of rubber curing agents (also called vulcanizing agents) may be employed, including sulfur or peroxide-based curing systems. Curing agents are described in Kirk-Othmer, ENCYCLOPEDIA OF CHEMICAL TECHNOLOGY, Vol. 20, pgs. 365-468, ($3^{rd}$ Ed. 1982), particularly *Vulcanization Agents and Auxiliary Materials*, pgs. 390-402, and A. Y. Coran, *Vulcanization*, ENCYCLOPEDIA OF POLYMER SCIENCE AND ENGINEERING, ($2^{nd}$ Ed. 1989), which are incorporated herein by reference. Vulcanizing agents may be used alone or in combination.

Other ingredients that are typically employed in rubber compounding may also be added to the rubber compositions. These include accelerators, accelerator activators, oils, plasticizer, waxes, scorch inhibiting agents, processing aids, zinc oxide, tackifying resins, reinforcing resins, fatty acids such as stearic acid, peptizers, and antidegradants such as antioxidants and antiozonants. In particular embodiments, the oils that are employed include those conventionally used as extender oils, which are described above.

All ingredients of the rubber compositions can be mixed with standard mixing equipment such as Banbury or Brabender mixers, extruders, kneaders, and two-rolled mills. In one or more embodiments, the ingredients are mixed in two or more stages. In the first stage (often referred to as the masterbatch mixing stage), a so-called masterbatch, which typically includes the rubber component and filler, is prepared. To prevent premature vulcanization (also known as scorch), the masterbatch may exclude vulcanizing agents. The masterbatch may be mixed at a starting temperature of from about 25° C. to about 125° C. with a discharge temperature of about 135° C. to about 180° C. Once the masterbatch is prepared, the vulcanizing agents may be introduced and mixed into the masterbatch in a final mixing stage, which is typically conducted at relatively low temperatures so as to reduce the chances of premature vulcanization. Optionally, additional mixing stages, sometimes called remills, can be employed between the masterbatch mixing stage and the final mixing stage. One or more remill stages are often employed where the rubber composition includes silica as the filler. Various ingredients including the thermoresponsive polymers of this invention can be added during these remills.

The mixing procedures and conditions particularly applicable to silica-filled tire formulations are described in U.S. Pat. Nos. 5,227,425, 5,719,207, and 5,717,022, as well as European Patent No. 890,606, all of which are incorporated herein by reference. In one embodiment, the initial masterbatch is prepared by including the thermoresponsive polymers of this invention and silica in the substantial absence of silica coupling agents and silica shielding agents.

The rubber compositions prepared from the thermoresponsive polymers of this invention are particularly useful for forming tire components such as treads, subtreads, sidewalls, body ply skims, bead filler, and the like. Preferably, the thermoresponsive polymers of this invention are employed in tread and/or sidewall formulations. In one or more embodiments, these tread or sidewall formulations may include from about 10% to about 100% by weight, in other embodiments from about 35% to about 90% by weight, and in other embodiments from about 50% to about 80% by weight of the thermoresponsive polymer based on the total weight of the rubber within the formulation.

Where the rubber compositions are employed in the manufacture of tires, these compositions can be processed into tire components according to ordinary tire manufacturing techniques including standard rubber shaping, molding and curing techniques. Typically, vulcanization is effected by heating the vulcanizable composition in a mold; e.g., it may be heated to about 140° C. to about 180° C. Cured or crosslinked rubber compositions may be referred to as vulcanizates, which generally contain three-dimensional polymeric networks that are thermoset. The other ingredients, such as fillers and processing aids, may be evenly dispersed throughout the crosslinked network. Pneumatic tires can be made as discussed in U.S. Pat. Nos. 5,866,171, 5,876,527, 5,931,211, and 5,971,046, which are incorporated herein by reference.

In order to demonstrate the practice of the present invention, the following examples have been prepared and tested. The examples should not, however, be viewed as limiting the scope of the invention. The claims will serve to define the invention.

EXAMPLES

Example 1 (Control)

Polymerization of Control SBR

To a $N_2$ purged glass bottle was added 113.24 g hexane, 39.60 g 21.3 wt % butadiene in hexane, 9.90 g 32.1 wt % styrene in hexane, 0.34 mL 1.45 M n-butyllithium in hexane, and 0.03 mL of 1.6 M 2-(ditetrahydrofuryl)propane at room temperature. The bottle was subsequently sealed and placed into a 65° C. agitation bath to mix for 1 hour. The bottle was allowed to cool to room temperature and 0.08 mL of diphenylethylene was added and allowed to mix in a room temperature agitation bath. After 30 minutes the reaction was quenched by addition of 2-propanol containing 2,6-di-tert-butyl-4-methylphenol. The polymer isolated by coagulation and drum drying had the following properties (96.8% yield): $M_n$=87 kg/mol, $M_w$=90 kg/mol, wt % styrene=16.3%, vinyl in the polybutadiene segments=17.4%.

Example 2

Polymerization of SBR-Poly(Ethylene Glycol) Methyl Methacrylate End Block (10 Units)

To a $N_2$ purged glass bottle was added 113.24 g hexane, 39.60 g 21.3 wt % butadiene in hexane, 9.90 g 32.1 wt % styrene in hexane, 0.34 mL 1.45 M n-butyllithium in hexane, and 0.03 mL of 1.6 M 2-(ditetrahydrofuryl)propane at room temperature. The bottle was subsequently sealed and placed into a 65° C. agitation bath to mix for 1 hour. The bottle was allowed to cool to room temperature and 0.08 mL of diphenylethylene was added and allowed to mix for 1 hour in a room temperature agitation bath. To the mixture was added 1.41 mL of poly(ethylene glycol) methyl methacrylate, Mn=300 and allowed to further react in a room temperature agitation bath. After 1 hour the reaction was quenched by addition of 2-propanol containing 2,6-di-tert-butyl-4-methylphenol. The polymer isolated by coagulation and drum drying had the following properties (88.2% yield): $M_n$=84 kg/mol, $M_w$=92 kg/mol, wt % styrene=15.3%, vinyl in the polybutadiene segments=18.9%, MA-PEG=2.7%.

Example 3

Polymerization of SBR-Poly(Ethylene Glycol) Methyl Methacrylate End Block (20 Units)

To a $N_2$ purged glass bottle was added 112.46 g hexane, 39.60 g 21.2 wt % butadiene in hexane, 9.90 g 32.2 wt % styrene in hexane, 0.33 mL 1.52 M n-butyllithium in hexane, and 0.03 mL of 1.6 M 2-(ditetrahydrofuryl)propane at room temperature. The bottle was subsequently sealed and placed into a 65° C. agitation bath to mix for 1 hour. The bottle was allowed to cool to room temperature and 0.08 mL of diphenylethylene was added and allowed to mix for 1 hour in a room temperature agitation bath. The bottle was cooled to −20° C. and 2.83 mL of poly(ethylene glycol) methyl methacrylate, $M_n$=300 was added allowed to further react at −20° C. After 1 hour the reaction was quenched by addition of 2-propanol containing 2,6-di-tert-butyl-4-methylphenol. The polymer isolated by coagulation and drum drying had the following properties (92.3% yield): $M_n$=82 kg/mol, $M_w$=85 kg/mol, wt % styrene=18.5%, vinyl in the polybutadiene segments=16.5%, MA-PEG=5.3%.

Various modifications and alterations that do not depart from the scope and spirit of this invention will become apparent to those skilled in the art. This invention is not to be duly limited to the illustrative embodiments set forth herein.

What is claimed is:

1. A method for preparing a functionalized polymer, the method comprising steps of:
   (i) anionically polymerizing conjugated diene monomer and vinyl-substituted aromatic monomer to form a living polymer having a living chain end associated with the anionically polymerizing the conjugated diene monomer and the vinyl-substituted aromatic monomer where the living polymer has a glass transition temperature of less than 0° C., a number average molecular weight from 25,000 g/mol to 1,000,000 g/mol, and a cis-1,4-linkage content of from about 10% to about 60%; and
   (ii) reacting the living chain end from the anionically polymerizing the conjugated diene monomer and the vinyl-substituted aromatic monomer of the living polymer with a [poly(hydrocarbylene glycol) hydrocarbyl ether] (meth)acrylate functionalizing agent to form the functionalized polymer.

2. The method of claim 1, where the [poly(hydrocarbylene glycol) hydrocarbyl ether] (meth)acrylate functionalizing agent is defined by the formula I:

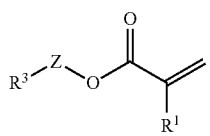

where R¹ is a hydrogen atom or a methyl group, Z is a hydrocarbylene glycol group, and R³ is an hydrocarbyl group.

3. The method of claim 1, where the [poly(hydrocarbylene glycol) hydrocarbyl ether] (meth)acrylate functionalizing agent is defined by the formula II:

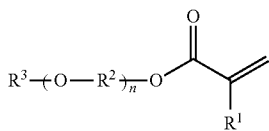

where R¹ is a hydrogen atom or a methyl group, R² is a hydrocarbylene group, R³ is a hydrocarbyl group, and n is an integer from about 3 to about 8.

4. The method of claim 1, where the [poly(hydrocarbylene glycol) hydrocarbyl ether] (meth)acrylate functionalizing agent is defined by the formula III:

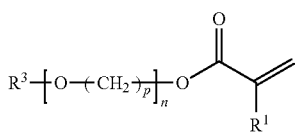

where R¹ is a hydrogen atom or a methyl group, R³ is a hydrocarbyl group, p is an integer from about 1 to about 12 units, and n is an integer from about 3 to about 8 units.

5. The method of claim 1, where the [poly(hydrocarbylene glycol) hydrocarbyl ether] (meth)acrylate functionalizing agent is defined by the formula IV:

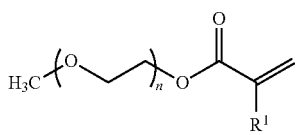

where R¹ is a hydrogen atom or a methyl group and n is an integer from about 3 to about 8 units.

6. The method of claim 1, where the [poly(hydrocarbylene glycol) hydrocarbyl ether] (meth)acrylate functionalizing agent is selected from poly(methylene glycol) methyl ether methacrylate, poly(methylene glycol) methyl ether acrylate, poly(1-methylethylene glycol) methyl ether methacrylate, poly(1-methylethylene glycol) methyl ether acrylate, poly(ethylene glycol) methyl ether methacrylate, poly(ethylene glycol) methyl ether acrylate, poly(propylene glycol) methyl ether methacrylate, poly(propylene glycol) methyl ether acrylate, poly(2-methylpropylene glycol) methyl ether methacrylate, and poly(2-methylpropylene glycol) methyl ether acrylate.

7. The method of claim 1, where the [poly(hydrocarbylene glycol) hydrocarbyl ether] (meth)acrylate functionalizing agent is poly(ethylene glycol) methyl ether acrylate or poly(ethylene glycol) methyl ether methacrylate.

8. The method of claim 1, where the monomer is conjugated diene monomer and styrene.

9. The method of claim 1, where said step of anionically polymerizing is initiated with an anionic initiator, and where the anionic initiator is an organolithium compound, where the molar ratio of the anionic initiator to the [poly(hydrocarbylene glycol) hydrocarbyl ether] (meth)acrylate functionalizing agent is from about 1:2 to about 1:8.

10. The method of claim 1, the living polymer including polymer chains, where at least 20% of the polymer chains possess respective living ends for reaction with the [poly(hydrocarbylene glycol) hydrocarbyl ether] (meth)acrylate functionalizing agent.

11. A method for preparing a functionalized polymer, the method comprising steps of:
(i) anionically polymerizing conjugated diene monomer, and monomer copolymerizable therewith, to form a living polymer having a living chain end from the anionically polymerizing the conjugated diene monomer and the monomer copolymerizable therewith where the living polymer has a glass transition temperature of less than 0° C., a number average molecular weight from 25,000 g/mol to 1,000,000 g/mol, and a cis-1,4-linkage content of from about 10% to about 60%;
(ii) reacting the living chain end from the anionically polymerizing the conjugated diene monomer and the monomer copolymerizable therewith of the living polymer with a compatibilizing agent to prepare a sterically hindered living polymer having a sterically hindered living chain end; and
(iii) reacting the sterically hindered living chain end of the sterically hindered living polymer with a [poly(hydrocarbylene glycol) hydrocarbyl ether] (meth)acrylate functionalizing to form the functionalized polymer.

12. The method of claim 11, where the compatibilizing agent is defined by the formula

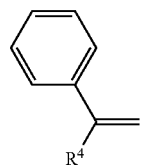

where R⁴ is a sterically bulky hydrocarbyl or a substituted sterically bulky hydrocarbyl group.

13. The method of claim 11, the living polymer including polymer chains, where at least 20% of the polymer chains possess respective living ends for reaction with the compatibilizing agent and subsequent reaction with the [poly(hydrocarbylene glycol) hydrocarbyl ether] (meth)acrylate functionalizing agent.

14. The method of claim 11, where the [poly(hydrocarbylene glycol) hydrocarbyl ether] (meth)acrylate functionalizing agent is defined by the formula I:

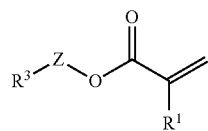

where R¹ is a hydrogen atom or a methyl group, Z is a hydrocarbylene glycol group, and R³ is an hydrocarbyl group.

15. The method of claim 11, where the [poly(hydrocarbylene glycol) hydrocarbyl ether] (meth)acrylate functionalizing agent is defined by the formula II:

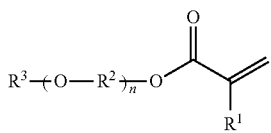

where R¹ is a hydrogen atom or a methyl group, R² is a hydrocarbylene group, R³ is a hydrocarbyl group, and n is an integer from about 3 to about 8.

16. The method of claim 11, where the [poly(hydrocarbylene glycol) hydrocarbyl ether] (meth)acrylate functionalizing agent is defined by the formula III:

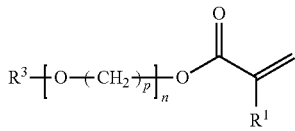

where R¹ is a hydrogen atom or a methyl group, R³ is a hydrocarbyl group, p is an integer from about 1 to about 12 units, and n is an integer from about 3 to about 8 units.

17. The method of claim 11, where the [poly(hydrocarbylene glycol) hydrocarbyl ether] (meth)acrylate functionalizing agent is defined by the formula IV:

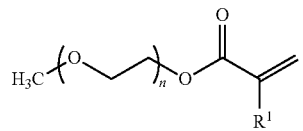

where R¹ is a hydrogen atom or a methyl group and n is an integer from about 3 to about 8 units.

18. The method of claim 11, where the [poly(hydrocarbylene glycol) hydrocarbyl ether] (meth)acrylate functionalizing agent is selected from poly(methylene glycol) methyl ether methacrylate, poly(methylene glycol) methyl ether acrylate, poly(l-methylethylene glycol) methyl ether methacrylate, poly(l-methylethylene glycol) methyl ether acrylate, poly(ethylene glycol) methyl ether methacrylate, poly(ethylene glycol) methyl ether acrylate, poly(propylene glycol) methyl ether methacrylate, poly(propylene glycol) methyl ether acrylate, poly(2-methylpropylene glycol) methyl ether methacrylate, and poly(2-methylpropylene glycol) methyl ether acrylate.

19. The method of claim 11, where the [poly(hydrocarbylene glycol) hydrocarbyl ether] (meth)acrylate functionalizing agent is poly(ethylene glycol) methyl ether acrylate or poly(ethylene glycol) methyl ether methacrylate.

20. The method of claim 11, where the monomer copolymerizable therewith is styrene, where said step of anionically polymerizing is initiated with an anionic initiator, and where the anionic initiator is an organolithium compound, where the molar ratio of the anionic initiator to the [poly(hydrocarbylene glycol) hydrocarbyl ether] (meth)acrylate functionalizing agent is from about 1:2 to about 1:8.

* * * * *